US008667172B2

(12) United States Patent
Ravindran et al.

(10) Patent No.: US 8,667,172 B2
(45) Date of Patent: Mar. 4, 2014

(54) METHOD AND APPARATUS FOR CONTENT IDENTIFIER BASED RADIUS CONSTRAINED CACHE FLOODING TO ENABLE EFFICIENT CONTENT ROUTING

(75) Inventors: Ravishankar Ravindran, San Jose, CA (US); Guoqiang Wang, San Jose, CA (US); Kathleen Nichols, Woodside, CA (US)

(73) Assignee: Futurewei Technologies, Inc., Plano, TX (US)

( * ) Notice: Subject to any disclaimer, the term of this patent is extended or adjusted under 35 U.S.C. 154(b) by 260 days.

(21) Appl. No.: 13/311,782

(22) Filed: Dec. 6, 2011

(65) Prior Publication Data

US 2012/0317307 A1    Dec. 13, 2012

Related U.S. Application Data

(60) Provisional application No. 61/494,253, filed on Jun. 7, 2011.

(51) Int. Cl.
*G06F 15/173* (2006.01)

(52) U.S. Cl.
USPC ........... 709/238; 709/224; 709/231; 709/232; 709/243; 370/228; 370/230; 370/351; 370/389; 370/390

(58) Field of Classification Search
USPC ................. 709/238, 224, 231, 232, 243, 200; 370/228, 230, 351, 389, 390
See application file for complete search history.

(56) References Cited

U.S. PATENT DOCUMENTS

| 8,429,296 | B2 * | 4/2013 | Ellis et al. ............... 709/243 |
| 2001/0056416 | A1 * | 12/2001 | Garcia-Luna-Aceves ........ 707/2 |
| 2002/0126671 | A1 * | 9/2002 | Ellis et al. ............... 370/390 |
| 2003/0200307 | A1 * | 10/2003 | Raju et al. ............... 709/224 |
| 2005/0216559 | A1 | 9/2005 | Manion et al. |
| 2006/0271705 | A1 * | 11/2006 | Garcia-Luna-Aceves .... 709/242 |
| 2011/0090908 | A1 | 4/2011 | Jacobson et al. |

FOREIGN PATENT DOCUMENTS

CN          102045252 A     5/2011

OTHER PUBLICATIONS

Foreign Communication From a Related Counterpart Application, PCT Application No. PCT/CN2012/076497, International Search Report dated Sep. 20, 2012, 3 pages.
Foreign Communication From a Related Coutnerpart Application, PCT Application No. PCT/CN2012/076497, Written Opinion dated Sep. 20, 2012, 8 pages.

(Continued)

*Primary Examiner* — Jude Jean Gilles
(74) *Attorney, Agent, or Firm* — Conley Rose, P.C.; Grant Rodolph; Brandt D. Howell

(57) ABSTRACT

A networking system comprising a plurality of content routers coupled to each other and to a plurality of providers and configured to route and cache content data, wherein the content routers are further configured to locate and route requested content to a user node coupled to the content routers, wherein the providers are configured to publish content and the content routers are further configured to receive and cache the content data in response to an interest request for content and to flood a content identifier for the content data to a plurality of neighboring content routers within a specified radius, wherein the content identifier enables the plurality of neighboring content routers to determine a nearest location from which to obtain the content data to enable efficient content routing.

20 Claims, 12 Drawing Sheets

(56) References Cited

OTHER PUBLICATIONS

Dong, Lijun, et al., "Performance Evaluation of Content Based Routing with In-Network Caching," IEEE, 2011 20th Annual Wireless and Optical Communications Conference (WOCC), Apr. 15-16, 2011, 6 pages.

"Motoblur," Motorola Mobility, Inc. USA, http://www.motorola.com/Consumers/US-EN-Consumer-Product-andServices-/MOTOBLUR, downloaded Aug. 31, 2011, 2 pages.

* cited by examiner

US 8,667,172 B2

METHOD AND APPARATUS FOR CONTENT IDENTIFIER BASED RADIUS CONSTRAINED CACHE FLOODING TO ENABLE EFFICIENT CONTENT ROUTING

CROSS-REFERENCE TO RELATED APPLICATIONS

The present application claims the benefit of U.S. Provisional Patent Application No. 61/494,253 filed Jun. 7, 2011 by Ravi Ravindran et al. and entitled "Method and Apparatus for Prefix Based Radius Constrained Cache Flooding to Enable Efficient Content Routing," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON) also referred to herein as a Content Centric Network (CCN), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

SUMMARY

In one embodiment, the disclosure includes a networking system comprising a plurality of content routers coupled to each other and to a plurality of providers and configured to route and cache content data, wherein the content routers are further configured to locate and route requested content to a user node coupled to the content routers, wherein the providers are configured to publish content and the content routers are further configured to receive and cache the content data in response to an interest request for content and to flood a content identifier for the content data to a plurality of neighboring content routers within a specified radius, wherein the content identifier enables the plurality of neighboring content routers to determine a nearest location from which to obtain the content data to enable efficient content routing.

In another embodiment, the disclosure includes a content router comprising a receiver configured to receive a content portion in a network in response to an interest request, a content store configured to store the content portion, and a transmitter configured to forward the content portion to a next-hop in the network indicated by matching a content identifier of content in a forwarding information base (FIB) and flood the content identifier to one or more neighboring content routers that are within a specified radius of the content router to enable the neighboring content routers to efficiently determine a nearest location for the content.

In a third aspect, the disclosure includes a method implemented by at least one content router in a network, comprising receiving at least a portion of content forwarded from a source in response to an interest request, caching the portion of content in a content store, forwarding the portion of content to a next-hop indicated by matching a content identifier of content in a FIB, and advertising a content identifier at higher granularity than the content identifier in the FIB to a plurality of neighboring content routers that extend over a zone determined according to a selected certain radius parameter encoded as a time to live (TTL) parameter.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
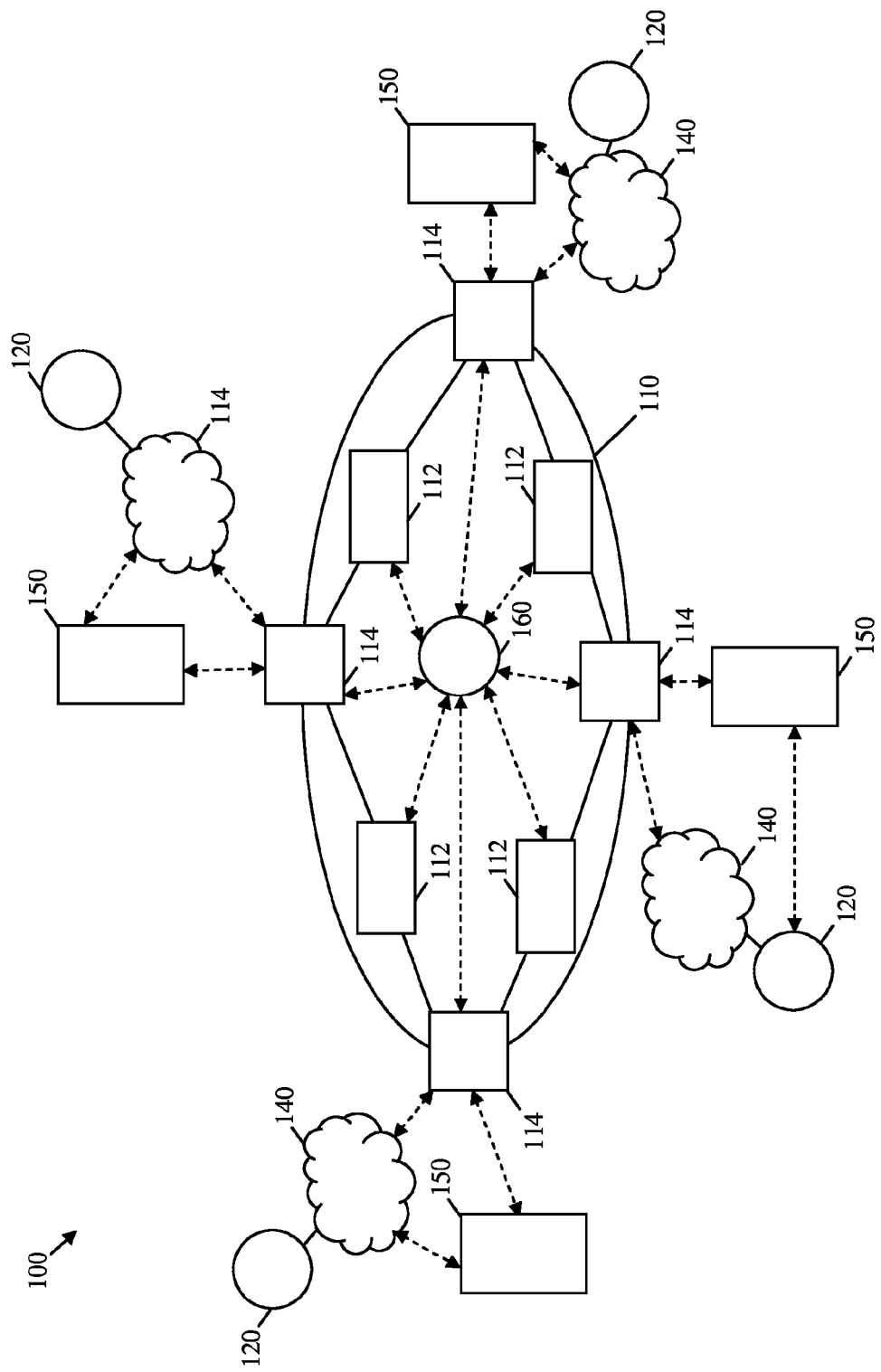
FIG. 1 is a schematic diagram of one embodiment of a CCN.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The CCN (or CON) may be used as an infrastructure to establish an Information Centric Network (ICN). The ICN's objective may comprise efficient, secure, and reliable dissemination of user requested content over a distributed networking infrastructure (e.g., the CCN) to meet both the user's and ICN service provider's requirements. The forwarded information in the ICN may include multimedia (e.g., voice, video, text) pertaining to human conversation, streaming, gaming, multipoint-to-multipoint (M2M) communications, and/or other exchanged information and data. One of the building blocks of an ICN infrastructure may be the content router. A content router may execute a basic functionality of accepting requests for content objects (items) and resolving and guiding the requests to potential closest location(s) in the ICN for retrieval. The requests for the content objects may be based on names that uniquely identify the content objects in the network. The names may be resolved using a centralized dictionary approach or in a distributed manner by routing the request over the network, e.g., using a logic embedded in a forwarding plane of the ICN. In the latter case, a FIB may be managed by a routing protocol that enables reachability to announced prefixes, which may be published at different points of the network.

The ICN may be an efficient platform based on two properties. The ICN property is the transparent caching ability of the content packets on the wire (or link), which may allow re-using the cached content for future requests. The second ICN property is the ability to search for the requested resource in the network by allowing the interest (request) packet to be forwarded along multiple directions. Some routing schemes may be based on flooding or routing algorithms that may be used for Internet Protocol (IP) routing in a CCN. The routing algorithms to forward the interest packets may include a shortest path first algorithm and other variants, such as a K-Shortest path first algorithm. Such routing techniques may be efficient for IP, since the goal may be to transport packets between any two points along a quickest path. However, the intent of the interest packets in the CCN context may be to find the content chunk (or portion) that is requested as quickly as possible (within the network or from the source) so that the content may be returned back to the requesting user with minimum or reduced latency.

Disclosed herein is a system and methods for an improved forwarding or routing technique for establishing content prefix availability in a network. The system and methods may enable an expressed interest packet to be substantially quickly directed to a closest content router, if the content has been previously cached in the network. The system and methods may enable ICN implementation and enable ICN objective and are described herein in the context of a CCN framework as one possible scenario or example of implementation. However, the system and methods may be implemented in other architectures or networks, which may have any combination of the following properties:

1) The information dissemination in the network may be based on user request and response for the information resources.
2) The network may use content routers as a packet switching platform, which may enable transparent caching.
3) The forwarding in the network may be based on the per-hop forwarding paradigm based on the name of the content requested.
4) A dynamic routing protocol may be used in the network to manage the entries of the FIB, which may be used by the forwarding logic in the content routers to forward the expressed interest packets.

FIG. 1 illustrates an embodiment of a CCN 100, where content may be routed based on a content identifier or name, such as, for example, name prefixes, where the prefixes may be, for example, human readable names or flat-ids, and delivered to users or customers based on request. The CCN 100 may comprise a network domain 110 that comprises a plurality of nodes, such as an IP domain, a Multiprotocol Label Switching (MPLS) domain, or an Ethernet domain. The network domain 110 may comprise a plurality of internal nodes 112 and a plurality of content routers 114, which may be coupled to each other via network links, e.g., fixed connections. The content routers 114 may be coupled to a plurality of customer nodes 120, via a plurality of access networks 140, and to a plurality of customer sites 150, as shown in FIG. 1. The CON 100 may also comprise a management plane 160 that may communicate with the internal nodes 112 and/or the content routers 114.

The internal nodes 112 may be any nodes, devices, or components that support transportation of traffic, e.g., frames and/or packets, through the CCN 100. The internal nodes 112 may pass the traffic onto or receive the traffic from other nodes in the same network domain 110. For example, the internal nodes 112 may be routers, switches, or bridges, such as backbone core bridges (BCBs), provider core bridges (PCBs), or label switch routers (LSRs). The internal nodes 112 may also comprise content routers 114 that forward content based on content name prefixes. A prefix is an identifier that maps the name of a content item to a content chunk, where the binding between the content chunk and the name is generated by the content producer. A prefix may be a human-readable identifier or may be a flat-id. A content chunk/object is a self-sustaining atomic unit of data that may be obtained from any part of the network and validated for its provenance, authenticity, etc.

The content routers 114 may be any nodes, devices or components that support transportation of traffic between the network domain 110 and external components. The content routers 114 may comprise edge nodes and internal network nodes (e.g., at least some of the internal nodes 112). The content routers 114 may be edge nodes that forward content traffic from the internal nodes 110 to the customer nodes 120 and/or the customer sites 150, e.g., based on a customer request or demand. The content routers 114 may also receive content requests from the customer nodes 120. For example, the content routers may be routers or bridges, such as backbone edge bridges (BEBs), provider edge bridges (PEBs), or label edge routers (LERs) that forward content based on content name prefixes. In some embodiments, content routers based on architectures such as CCN may be application layer (i.e., Level 3 (L3)) devices that may be overlaid over the IP layer (i.e., Level 2 (L2)) bridging technologies of MPLS systems. The internal nodes 112 and/or the content routers 114 may comprise or may be coupled to a plurality of content servers that store or cache content, which may be provided to customers or subscribers, e.g., upon demand. Additionally, the content routers 114 may comprise content stores that may be configured to cache at least some of the content forwarded in the CCN 100.

The customer nodes 120 may be nodes, devices, or components configured to deliver content to a user or customer and receive content requests from the user or customer. For instance, the customer nodes 120 may be fixed or mobile user-oriented devices, such as desktop computers, notebook computers, personal digital assistants (PDAs), or cellular telephones. Alternatively, the customer nodes 120 may be connectivity devices at customer premises, such as modems or set-top boxes. The customer nodes 120 may also comprise customer equipment (not shown) that may be configured to receive content from the content routers 114, via the access networks 140, and distribute the content to a plurality of customers. For instance, the customer nodes 120 may comprise optical network terminals (ONUs) and/or very high bit rate Digital Subscriber Line (VDSL) transceiver units at residential locations (VTU-Rs).

The access networks 140 may be any networks that provide access to the content in the CON 100, such as Virtual Private Networks (VPNs). The customer sites 150 may be any sites or office environments configured to receive content from the content routers 114 and may send the content to corresponding customer nodes 120, via the access networks 140. The customer sites 150 may also receive content requests from the customer nodes 120 and send the content requests to the content routers 114.

Figure 2:
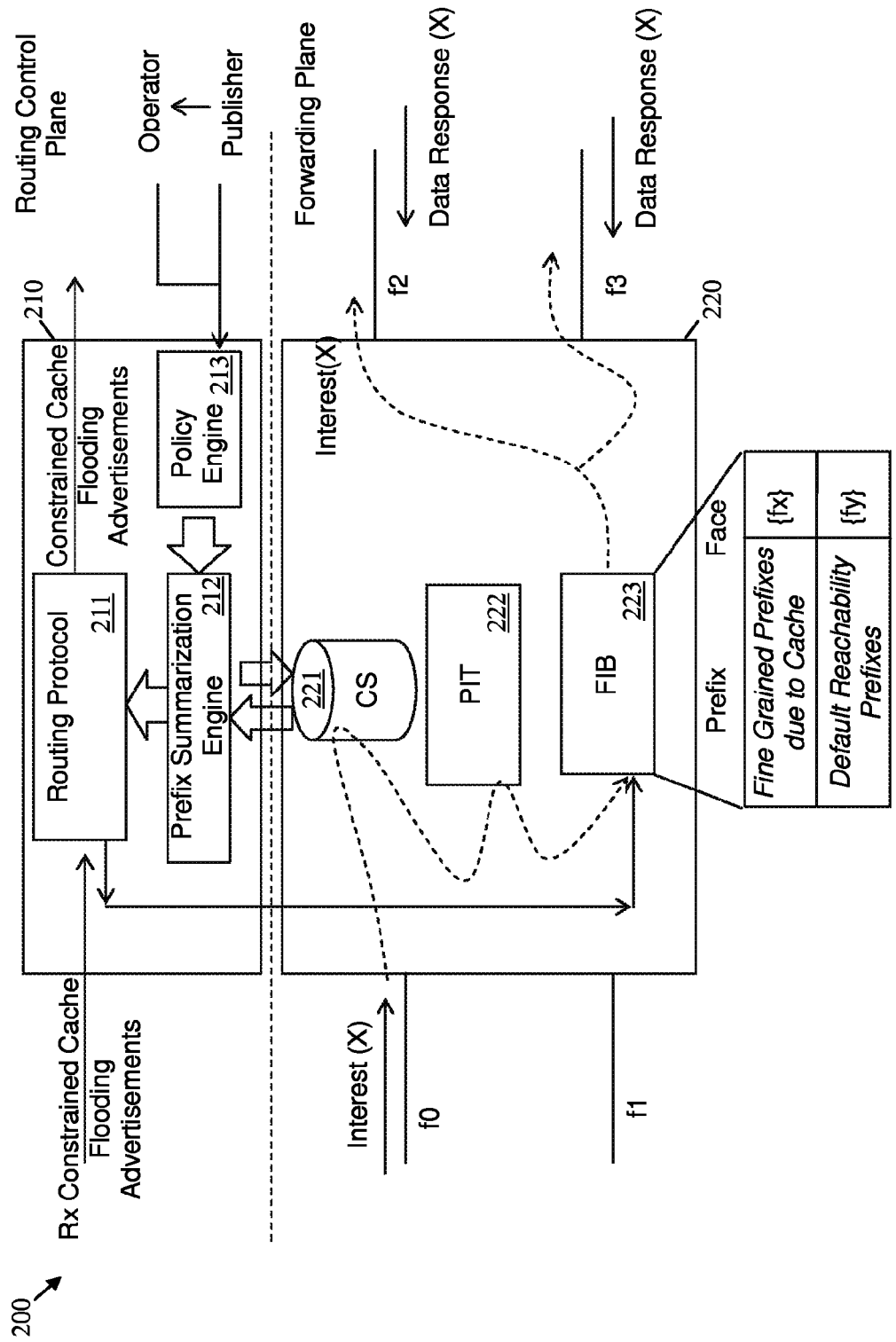
FIG. 2 is a schematic diagram of an embodiment of a router architecture.

FIG. 2 illustrates an embodiment of a router architecture 200, which may be used in any of the content routers 114 and/or internal nodes 112. The router architecture 200 may comprise a plurality of first elements 210 that operate at a routing control plane and a plurality of second elements 220 that operate at a data forwarding plane. The first elements 210 may comprise a routing protocol 211, a prefix summarization engine 212, and a policy engine 213. The second elements 220 may comprise a content store (CS) 221, a pending interest table (PIT) 222, and a FIB 223.

At the routing control plane, the routing protocol 211 may exchange advertisements (e.g., link state advertisements (LSAs)), comprising constrained cache flooding advertisements, with other content routers and/or network nodes, e.g., in a CCN. The routing protocol 211 may receive prefix information from the prefix summarization engine 212, and use the prefix information to route the advertisements. The routing protocol 211 may send prefix information received from the prefix summarization engine 212 in the forwarded advertisements and send prefix information from received advertisements to the FIB 223. The policy engine 213 may receive policy information from management layer on the publishers and/or content distributors who may want to take advantage of the service and forward the policy to the prefix summarization engine 212, which may use the policy information to select the prefixes sent to and/or received from the advertisements. The prefix summarization engine 212 may also exchange prefix information with the CS 221.

At the forwarding plane, the CS 221, PIT 222, and/or FIB 223 may receive, send, and forward interest packets (e.g., content object request) that indicate prefixes from/to other content routers and/or network nodes. The CS 221, PIT 222, and/or FIB 223 may also receive data responses (e.g., forwarded content objects based on request) from other content routers and/or network nodes in return to sending interest packets. The interest packets and data responses may be exchanged on a plurality of links coupled to a plurality of next hop nodes/routers (e.g., indicated by ports f0, f1, f2, f3, . . . ). The CS 221, PIT 222, and/or FIB 223 may also store at least some of the interest and data response information. For instance, the FIB 223 may maintain a prefix table that includes a plurality of fine grained prefixes due to caching and a plurality of default reachability prefixes, and may associate the prefixes with next hop nodes/routers. The CS 221 may cache (temporarily) or store (for longer time) at least some of the content received as data response to sent interest.

Figure 3:
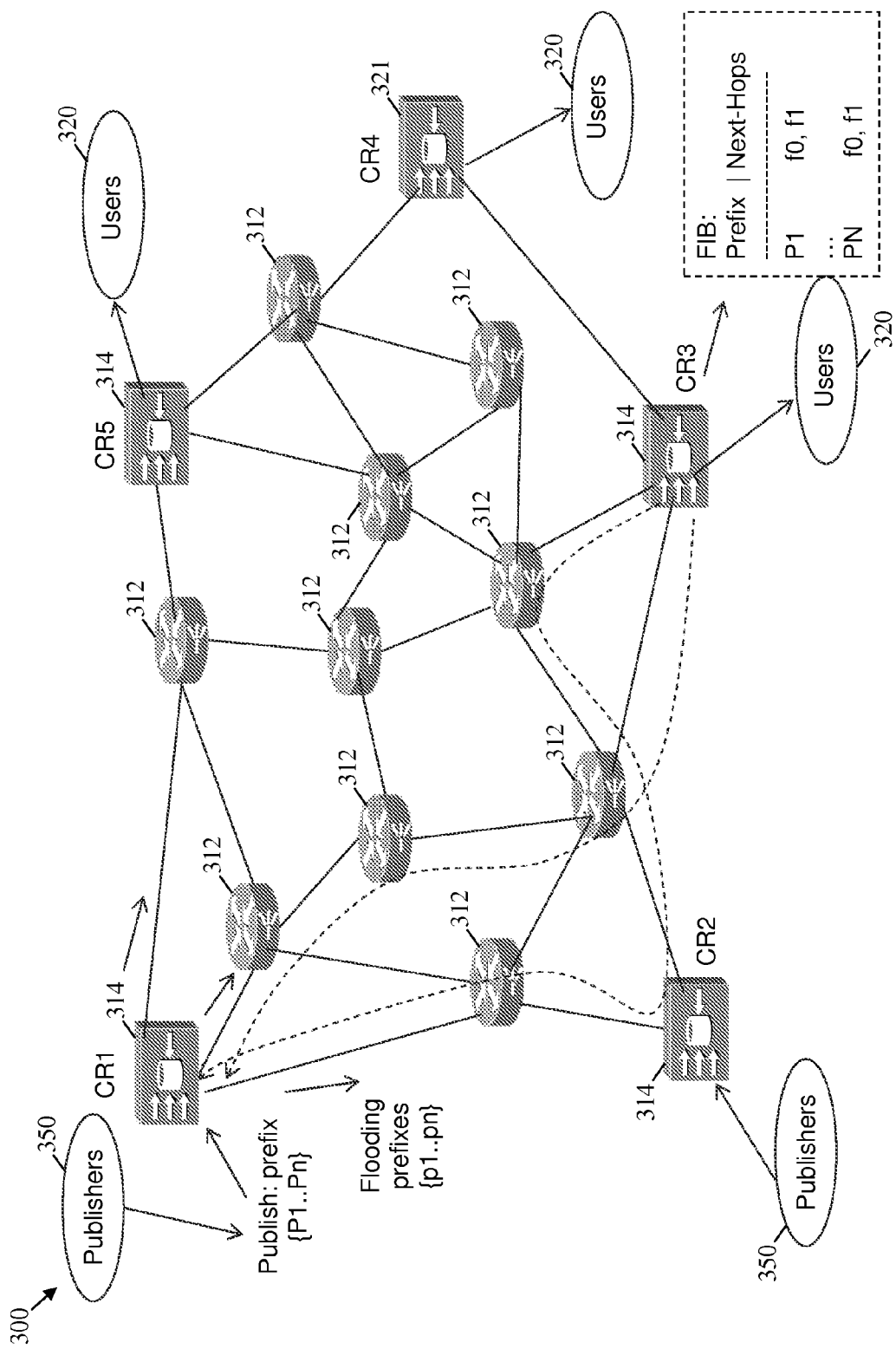
FIG. 3 is a schematic diagram of an embodiment of a scheme for establishing prefix reachability.

FIG. 3 illustrates an embodiment of a scheme 300 for establishing prefix reachability or prefix information flooding in a CCN. The scheme 300 may use a link state protocol (e.g., using LSAs) that may be enabled over the CCN. The scheme 300 may use a basic level reachability enabled by a content routing protocol (e.g., link state protocol) and a routing algorithm to compute the FIB. In the scheme 300, publishers 350 may announce the availability of content through edge content routers 314 (e.g., CR1, and CR2). The publishing actions of the publishers 350 at the edge content routers 314 may trigger the routing protocol to flood the published content reachability across the network, e.g., along a plurality of content routers 312. The announcements for content reachability may be sent with a relatively highly aggregated prefix level to limit the size of the FIB (at the different content routers 312) for efficient lookup. The FIB may indicate a plurality of prefixes (with high aggregation) and the associated next hop nodes/routers (f0, f1, . . . ).

For example, an edge content router 314 labeled CR3 may have a FIB that includes name-prefix entries for prefixes {P1 . . . Pn} that are announced by another edge content router 314 labeled CR1. In the context of a CCN network, the FIB entries may be used to achieve reachability to the indicated prefixes based on the routing algorithm used to compute the FIB table in each content router 312 and 314. The FIB may be constructed using a multi-path routing algorithm. As such, CR3 may use its FIB to communicate with the previous hops associated with the prefixes in the FIB to obtain associated content. The content may be requested by a user 320 coupled to CR3. The next hops may in turn use their FIBs to communicate with second next hops until an initial content router 314 (CR1) where the prefixes were first advertised is reached or until an internal content router 312 that caches the content is reached. The dashed line arrows in FIG. 3 indicate two possible paths that may be traversed from CR1 to CR3 to reach content associated with prefixes P1 to PN (N is an integer) based on the FIBs in the content routers 312.

Figure 4:
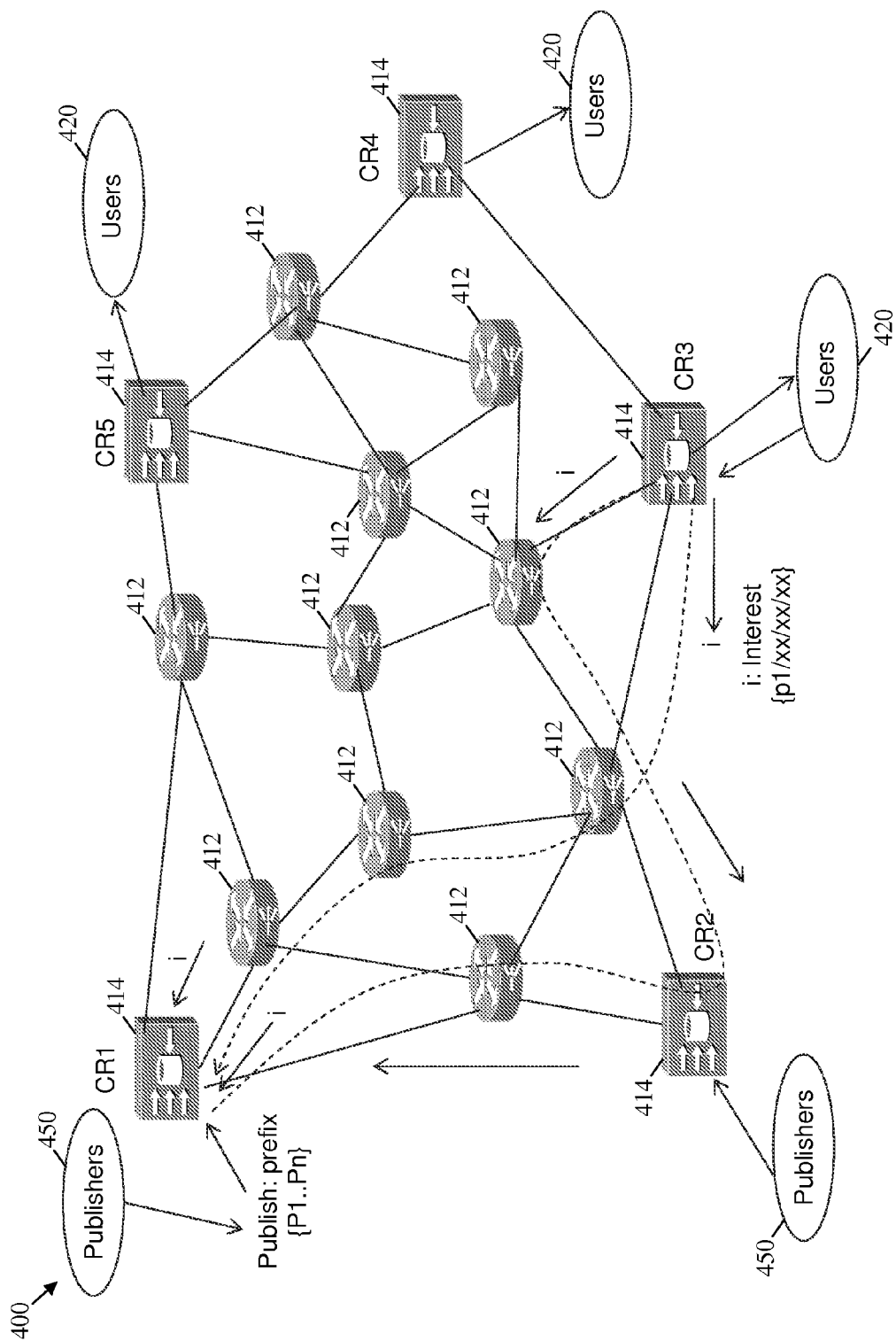
FIG. 4 is a schematic diagram of an embodiment of a scheme for interest routing.

FIG. 4 illustrates an embodiment of a scheme 400 for interest routing in the CCN to obtain content requested by a user 420. The interest (labeled i) may be sent by an edge content router 414 (CR3) coupled to the user 420 across the network to reach the content cached at another content router 414 (CR1). The interest may indicate a prefix (e.g., p1/xx/xx/xx} for the requested content. The interest may be routed using the FIBs in the content routers 412/414 (established as described above) to reach CR1 where the content was initially published by a publisher 450 before user activity causes the content to be cached across content router 412 across the network. The prefix indicated in the interest may be matched with the highly aggregated prefix (e.g. P1) in the FIB at each content router 412/414 to determine the next hop for routing the interest. Thus, the paths across the network for routing the interest may match the paths for advertising the prefix reachability.

Figure 5:
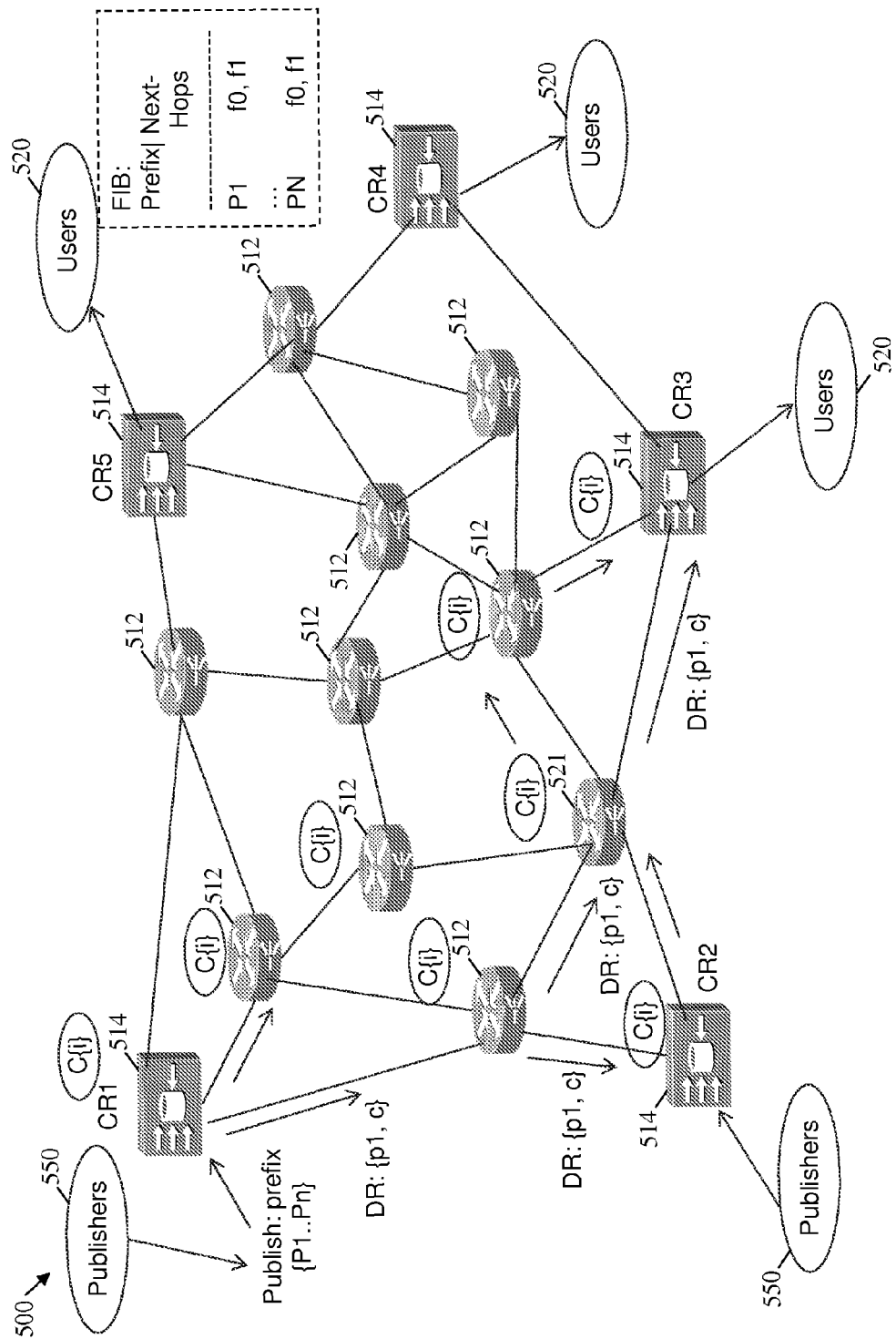
FIG. 5 is a schematic diagram of an embodiment of a scheme for data response and caching.

During the bootstrapping (initial setup) phase of the CCN, content may not be cached in the network. Hence, any request for content may be resolved and served from the original serving points, e.g., the initial content routers where content was published. Subsequently, as users request more content, the published content may be cached in the content routers, e.g., to meet future demands or requests. FIG. 5 illustrates an embodiment of a scheme 500 for data response and caching in the CCN. The scheme 500 may be implemented in response to a content request and associated interest routing, e.g., using the scheme 400. The scheme 500 may be implemented prior during the bootstrapping phase (before content caching in the network) to respond to content requests and cache at least a portion of the content at a plurality of content routers 512 in the network. For example, an edge content router 514 (CR1) may receive an interest packet sent by another edge content router 514 (CR3) along the content routers 512 indicated by the FIB. The content may be published by a publisher 550 at CR1 and requested by a user 520 at CR3. The requested content that matches the interest prefix may then be forwarded (data response) from CR1 to CR3 cached at the content routers 512 along the forwarding path (labeled C{i}). Thus, the paths across the network for routing and caching the content is limited to the paths used for routing the interest.

It is advantageous to improve the content routing (to enable a strategy where a user content request may be resolved to the closest cache point (e.g., content router) in the network. Using routing techniques that are cache unaware, e.g., that directly apply traditional routing algorithms used for IP routing without considering the internally cached content across the network, may be inefficient. For example, the default cache unaware techniques, such as the scheme 300 for advertising prefixes and establishing content reachability, may not be suitable since subsequent interest routing based on the advertised prefixes may miss the content routers across the network where the desired content may be cached. Instead, the interest may be routed all the way to an origin serving point, e.g., the initial content routers where content was published. This may result in inefficient content dissemination in the network and increased end-to-end content delivery latency.

Figure 6:
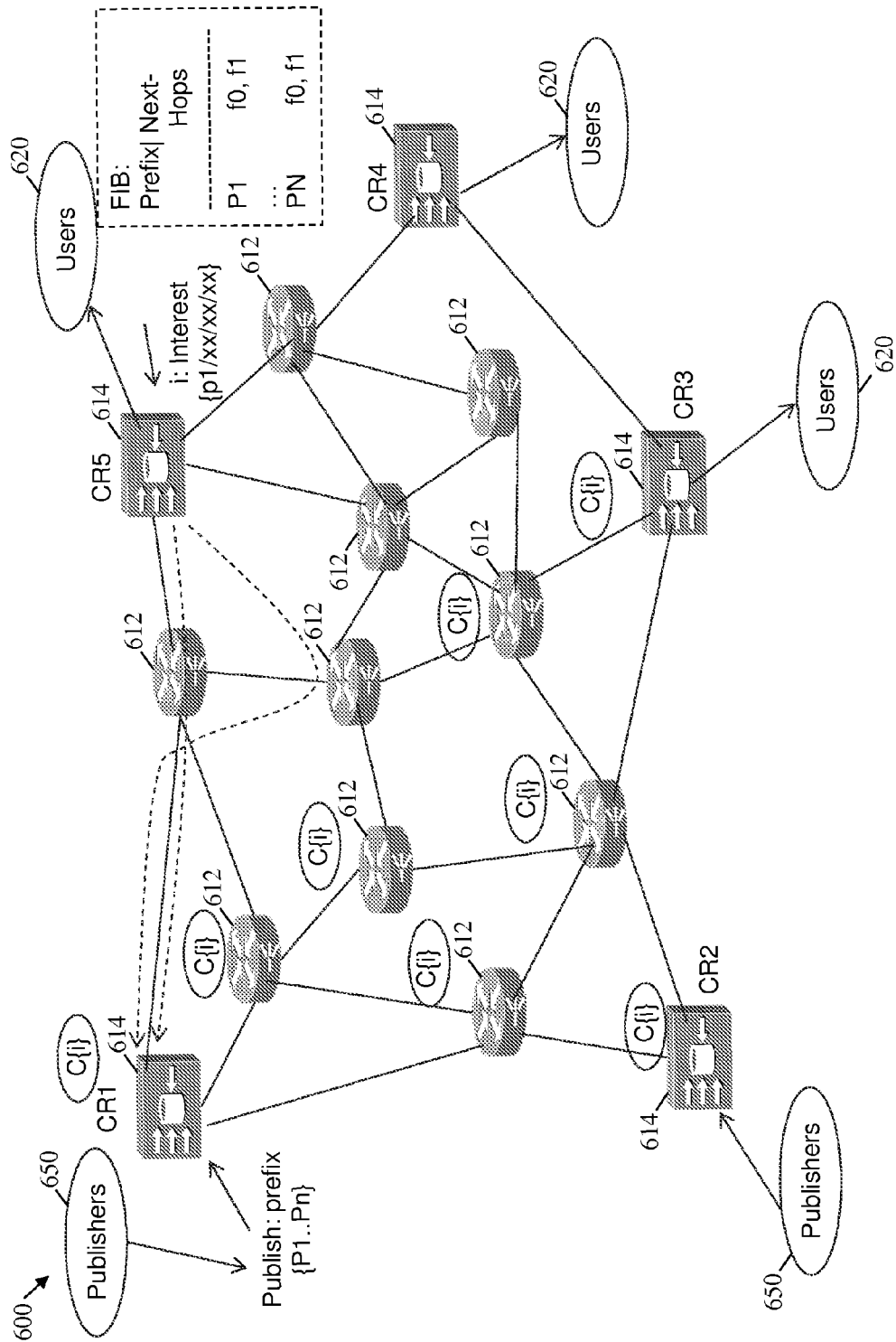
FIG. 6 is a schematic diagram of another embodiment of a scheme for interest routing.

FIG. 6 illustrates another embodiment of a scheme 600 for interest routing in the CCN to obtain content requested by a user 620. The scheme 600 may correspond to a scenario where the scheme 500 for data response and caching, that may be based on cache unaware based routing techniques may not be efficient or suitable. The interest (labeled i) may be sent by an edge content router 614 (CR5) coupled to the user 620 across the network to reach cached content. The interest may indicate a prefix (e.g., p1/xx/xx/xx} for the requested content and may be routed using the FIBs in the content routers 612/614. The cached content may be published by a publisher 650 coupled to a content router 614 (CR3).

The content may also have been cached along paths across the network in a data response to a previous interest routing by another content router 614 (CR1), e.g., as described in the scheme 500. However, in the scenario 600, the interest may be routed along different paths that comprise different content routers 612 than the content routers 612 where the content was previously cached (labeled C{i}. Thus, the interest routing in the scheme 600 may miss the content routers 612 where the content was previously cached and may route the interest all the way to the source content router CR1. This scenario may not take advantage of internal content caching, which may reduce content dissemination efficiency in the network and increase end-to-end content routing latency. One solution to avoid this scenario may be to flood out the interest on all the interfaces of the content routers 612 indicated in the FIB. However, this approach may cause a substantial amount of overhead and inefficiency in terms of interest routing.

Figure 7:
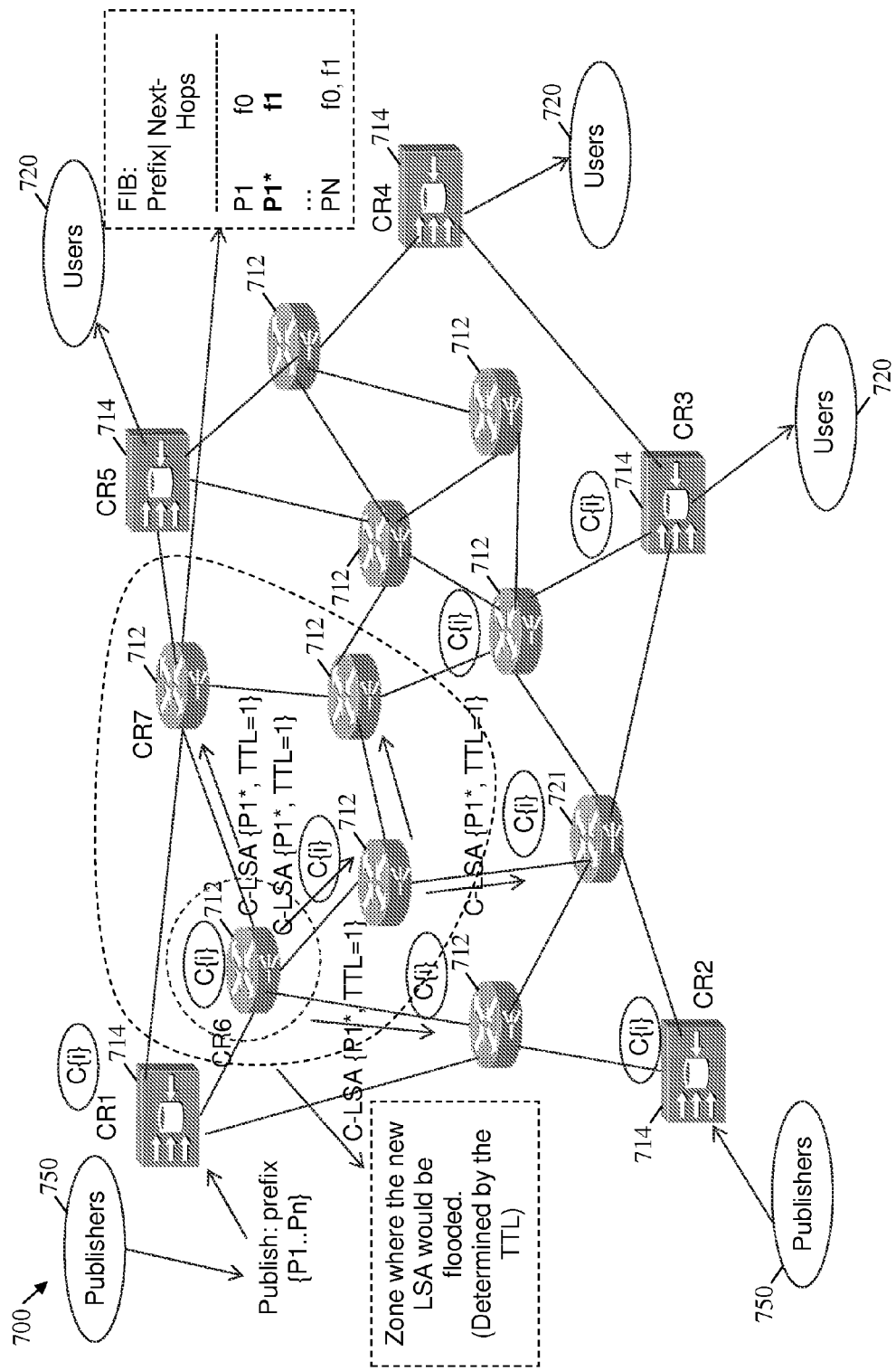
FIG. 7 is a schematic diagram of an embodiment of an improved scheme for establishing prefix reachability.

FIG. 7 illustrates an embodiment of an improved content routing scheme 700 for establishing prefix reachability or prefix information flooding in a CCN. The scheme 700 may use a link state protocol (e.g., using LSAs) that may be enabled over the CCN. The scheme 700 may provide improved reachability to announced prefixes to avoid the scenario in scheme 600 of missing previously cached content in the network. The scheme 700 may be implemented after a data response and content caching (e.g., using the scheme 500) in return to a content request.

Initially, the content may be published by a publisher 750 coupled to an edge content router 714 (CR1) and advertised in the network, e.g., using the scheme 300. A portion of the content may then be cached at a plurality of content routers 712 in the network. For instance, CR1 may receive an interest packet sent by another edge content router 714 (CR3), e.g., as described in the scheme 400, based on a request from a user 720 at CR3. The requested content that matches the interest prefix may then be forwarded (data response) from CR1 to CR3 using the FIB. Hence, at least a portion of the content may be cached at the content routers 712 along the forwarding path (labeled C{i}), e.g., similar to the scheme 500.

In the scheme 700, some of the content routers 712 that cache content may also be configured to flood or advertise prefixes to additional neighboring content routers 712. The neighboring content routers 712 may be next-hop nodes coupled directly, via corresponding network links, to the advertising content router 712. This may increase the number of content routers 712 or the network area with advertised prefixes and thus allow better content reachability to meet future interest routing (content requests) from different users 720 across the network with improved efficiency and reduced latency. Specifically, the prefixes may be flooded to the neighboring content routers 712 using a routing or link state protocol (e.g., using LSAs) that may be bounded or restricted based on policy for selecting prefixes, TTL criteria, or both. The extent of spreading prefix reachability in the network may be restricted to maintain efficiency and scalability.

A zone or area (indicated by a dashed line contour) is shown in FIG. 7 that comprises a group of content routers 712 that are flooded by neighboring content routers 712 and bounded by TTL and/or policy. The area may comprise content routers 712 that may maintain at least some of the prefixes of the content cached in the content routers 712 on the paths determined by initial interest routing, e.g., using the scheme 400. The content routers 712 (labeled C{i} on the initial paths may advertise to the neighboring content routers 712 (also labeled C{i} the selected prefixes with more granularity than the prefixes for content cached on the paths determined by initial interest routing. The higher granularity may provide more accurate location resolution of the cached content. For example, the content router 712 (CR6) on a path determined by initial interest routing from CR3 may advertise (e.g., using LSAs) a selected prefix with more granularity (P1*) to a group of neighboring content routers 712 (such as CR7) determined by TTL. The symbol "*" used with the prefix indicates higher granularity for the prefix. The selected prefixes (e.g., P1*) with more granularity may be indicated in entries of the FIBs of the content routers 712 in addition to the prefixes with highly aggregated prefixes (P1 . . . PN). The granularity of the selected prefixes may be determined based on policy, e.g., to optimize content caching and distribution in the network. For instance, different portions of content may be distributed among the content routers 712 to improve content reachability to meet user demand and routing efficiency to fetch the cached content.

Figure 8:
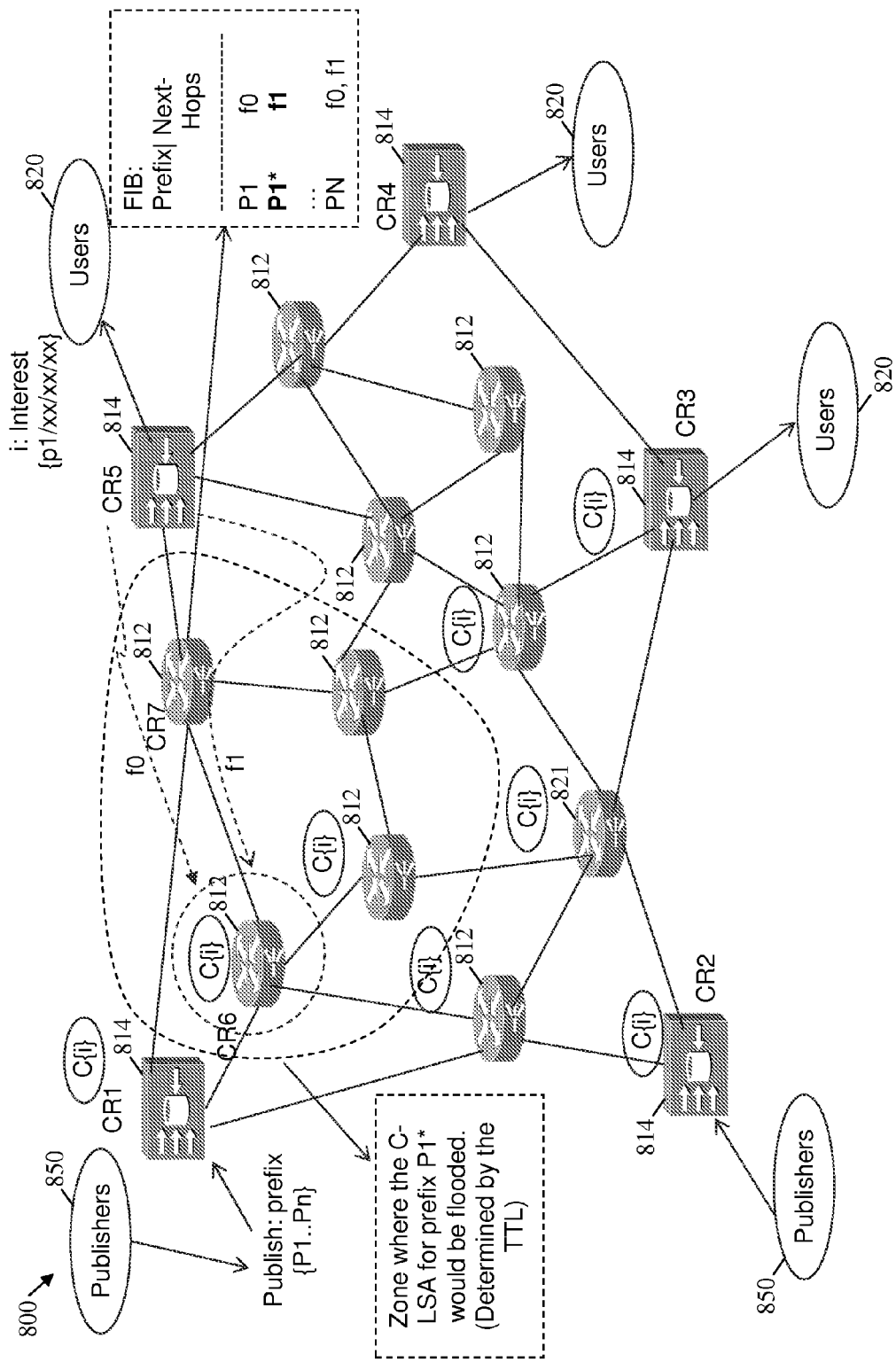
FIG. 8 is a schematic diagram of another embodiment of a scheme for interest routing.

FIG. 8 illustrates another embodiment of a scheme 800 for interest routing in the CCN to obtain content requested by a user 820. The scheme 800 may take advantage of the improved scheme 700 to reach the closest cache point (e.g., content router). The interest (labeled i) may be sent by an edge content router 814 (CR5) coupled to the user 820 across the network to reach the cached content. The interest may indicate a prefix (e.g., p1/xx/xx/xx} for the requested content and may be routed using the FIBs in the content routers 812/814. The cached content may be published by a publisher 850 coupled to a content router 814 (CR3), cached at a plurality of content routers 812 (labeled C{i}), and advertised using the scheme 700. Accordingly, the FIBs in the content routers 812 may comprise entries for both high level and low level granularity prefixes, as described above, and may indicate both content routers 812 where content was cached and additional neighboring content routers 812 advertised based on the scheme 700.

In the scheme 800, the interest from CR5 may be routed along a plurality of content routers 812 using their FIBs that comprise prefixes advertised by the scheme 700. Thus, the interest may be routed via the content router 812, CR7, to reach one of the content routers 812 (CR6) in the network that caches the requested content, e.g., instead of missing all internal content routers 812 that cache the content and reaching the source content router CR1 (as in the scheme 600). The paths for reaching CR6 using the FIBs with prefixes advertised by scheme 700 are indicated by dashed line arrows in FIG. 8.

Figure 9:
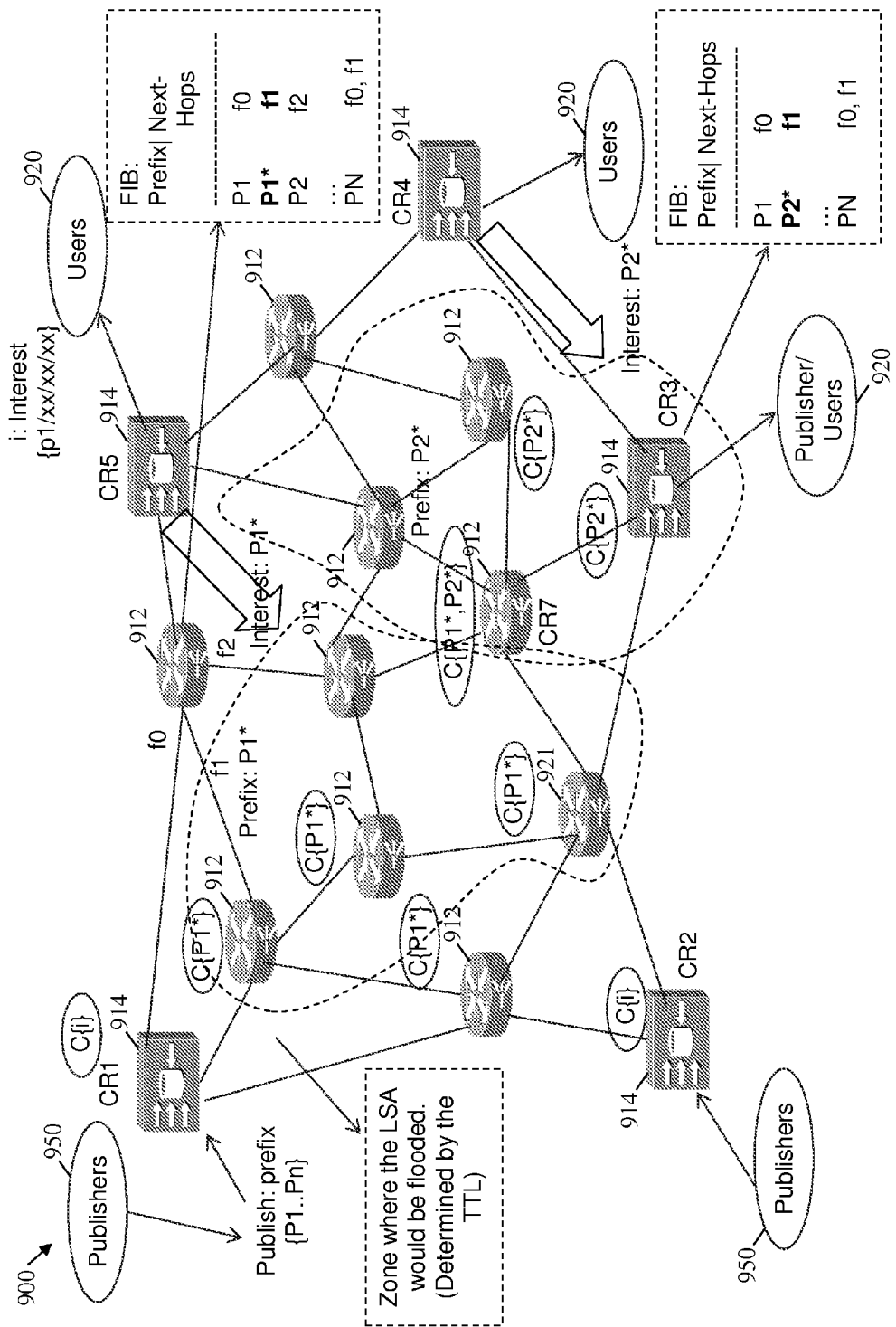
FIG. 9 is a schematic diagram of another embodiment of an improved scheme for establishing prefix reachability.

FIG. 9 illustrates another embodiment for an improved scheme 900 for establishing prefix reachability or prefix information flooding in a CCN. The scheme 900 may be similar to the scheme 700 and may use a link state protocol (e.g., using LSAs) that may be enabled over the CCN to provide improved reachability to announced prefixes. The scheme 900 may be implemented after a data response and content caching (e.g., using the scheme 500) in return to a content request. Initially, the content may be published by a publisher 950 coupled to an edge content router 914 (CR1) and advertised in the network, e.g., using the scheme 300. A portion of the content may then be cached at a plurality of content routers 912 in the network, for instance after CR1 receives an interest packet sent by another edge content router 914 (CR3) from a user 920.

The scheme 900 may be implemented to further flood or advertise prefixes from the content routers 912 that cache the content to neighboring content routers 912, in a manner similar to the scheme 700. The prefix flooding or advertisements may be restricted based on TTL and/or policy for selecting prefixes to maintain efficiency and scalability. Two zones or areas (indicated by two dashed line contours) are shown in FIG. 9 that comprise two corresponding groups of content routers 912, which may be flooded by the content routers 912. The extent of zones may also be bounded by a TTL parameter and/or enforcing a policy. The areas may comprise content routers 912 that may be flooded with prefixes for the cached content but may not cache the associated content. For example, each of the two zones may be flooded with a corresponding prefix (P1* or P2*) with higher granularity, for instance due to a corresponding interest forwarding event indicating the prefix. The two zones may be different since the interest routed may be sent by different content routers 912 for different users 920 and may have different policy and/or TTL for flooding to neighboring content routers 912. Specifically, the content routers 912 (labeled C{i} on the initial paths may advertise P1* to a first group of neighboring content routers 912 (labeled C{P1*}) with more granularity than the prefixes for content cached on the paths determined by initial interest routing. Similarly, the content routers 912 on the initial paths may advertise P2* to a second group of neighboring content routers 912 (labeled C{P2*}) with more granularity. The selected prefixes P1* and P2* may be indicated in entries of the FIBs of the content routers 912 in addition to the prefixes with less granularity (P1 . . . PN). The granularity of P1* and P2* may be determined based on policy, e.g., to optimize content caching and distribution in the network.

In the schemes 700 and 900, when caching content in the content routers, the content routers may be configured to selectively choose the set of prefixes that may be flooded using the routing protocol. The prefix names may be of the same granularity as the prefixes in the entries in the content stores of the content routers. Each prefix may correspond to a content chunk or portion stored in the content store. The content store of a content router may not comprise all portions or chunks of the content. However, if the content router determines that the all the chunks for content are available in its cache, the content router may set the prefix of the content to the name of the content. The content router may also include other elements in the entries, such as version details for the announcement, which may save a substantial amount of control overhead.

The LSAs used for advertising or announcing prefixes to neighbor content routers may be differentiated from the LSAs used for announcing the more aggregated prefixes. The higher granularity prefixes may be announced using opaque type LSAs associated information for appropriate processing. The opaque type LSAs are referred to herein as Customer-Label Switched Packets (C-LSPs) or Customer-LSAs interchangeably. The C-LSAs may carry multiple prefixes corresponding to the entries in the content store of the content router. The decision of which prefixes to choose from the content store may be based on the policies locally available in the content router. For example, all the prefixes corresponding to a content provider hulu.com may be chosen for such treatment.

In order to scale the flooding of such prefixes and control overhead, the C-LSAs may be associated with a lifetime (or TTL) in terms of number of hops on which it may be flooded. The lifetime or TTL may determine the flooding radius around the flooding content router. The TTL field may be used to control the overhead. A prefix announcement based on a higher TTL value may reach deeper (over a wider area) in the network, which may lead to more efficient content or prefix resolution, but may also increase cost of control overhead since more prefix announcements (LSAs) may be used. The TTL may also be used as a parameter to introduce service differentiation, which may be converted for policy consideration by the ICN service provider.

The neighbor content routers that receive these C-LSAs may be configured to properly process the C-LSAs. Other content routers that may be opaque routers and not configured to process the C-LSAs may store and forward (without processing) these C-LSAs based on the flooding logic of the routing protocol. The content routers that can process the C-LSAs may extract the prefixes announced in the C-LSAs, determine the next-hops based on the interest routing algorithm implemented, and add the extracted prefixes in the FIBs. To improve performance, all the content routers may be enabled to process and take advantage of the C-LSAs. In a network where a selected subset of content routers are enabled to process the C-LSAs, an appropriate setting of the TTL may be determined to ensure that prefix advertisements reach the selected content routers that are enabled to process the C-LSAs. However, even though the selected content routers can make intelligent routing decisions, the decisions may be overturned in the subsequent hops. Thus, the network topology may be considered to determine a proper value for the TTL and guarantee improved performance by prefix advertisement. For instance, the number of hops between any two of the selected content routers may also be considered. Specifically, the density of the selected content routers in the network may be considered so that even if there are intermediate nodes that may not process the C-LSAs, the setup or node layout may not negate the effectiveness of the routing decisions taken by the routers based on the C-LSAs.

In some scenarios, some of the content routers that receive the C-LSAs may already comprise the associated content in their content store. In such situations, these received advertisements may not require processing, since any request to these content routers may be locally resolved from their content stores. However, such content routers, based on local policy, may also generate C-LSAs. In this case, the region of information on where the content has been stored may be expanded to allow interests to be resolved by the content routers with cached content via the interest routing logic.

The prefixes in the received C-LSAs may be stored in new FIB entries, which may be matched to incoming requests (interest requests). The FIB entries derived from the C-LSAs may be assigned higher priority than the longest path prefix matching that may be applied by default for interest routing, since the routing entries from the C-LSAs may result in more improved interest routing and hence content dissemination than routing based on highly aggregated prefix entries. The interest request may be initially routed from the requesting node based on a longest prefix match, but the prefix resolution of the interest request may become more accurate when the routed interest reaches an island of content routers defined by the prefix flooding. For example, in scheme 700 above, after the C-LSA for prefix P1* is flooded out by CR6, CR7 may create a new routing entry for prefix P1* that points to face f1 which points to the closest cache point for content P1*. Hence, when CR5 forwards an interest for prefix P1* using its default routing, the interest may be resolved by CR7 to the closest point which is CR6. For cases where such entries don't lead to any match, the default routing on the aggregated prefixes, e.g. based on Longest Prefix Match (LPM), may be used.

Unlike standard LSAs (for announcing the more aggregated prefixes), the C-LSAs may be configured to adapt to the dynamic nature of the cache. Hence, the lifetime of the C-LSAs may be set to meet the expiry of cache in the initiating or source content router. This information may be encoded into the C-LSA or an expiry period based on empirical analysis may be configured by default in the content router. The C-LSA may be treated as soft-state that may become obsolete if it is not refreshed by the content router that has originally initiated it.

The initiating content router may control the number of hops that the C-LSA advertisement may be flooded out to, to control flooding scope. In some instances, the content router receiving the C-LSA may also receive and cache a copy of the content, but the content router's policy may still require the content router to flood the information and hence initiate a C-LSA for the same prefix as the cached content. This case may lead to relatively wide flooding to the network of the same prefix, which may not be desired. To control or limit the flooding, the content routing logic may be configured to check if any of the content router's neighbors has already announced the prefix. If a neighboring content router has already announced the prefix, then the content router may not generate a C-LSA for the prefix. If the prefix has not been announced by any of the neighbors, then the content router may advertise the prefix. The prefix may be advertised after a determined time after the expiry of the prefix, which may indicate that the content has been purged from a previous initiating content router.

In some scenarios, e.g., in an ICN, the publishers may be associated with determined edge points (content routers) in the network, as described above. Further, the users may be connected to the ICN service provider on the downstream, e.g. via an access network. In these scenarios, the schemes 700 and 900 may allow the resolution of content published by the content providers (publishers) relatively close to the end users by using the C-LSAs and the routing logic enabled over the ICN. For example, in scheme 900, two subsets of content routers 912 that form two groups or islands may be created by routing prefixes P1* and P2* as a result of publishing actions from two edge points coupled to publishers and actions by users to access the associated content.

In an embodiment, if flooding the relatively long prefixes from the content router is considered as excessive overhead, techniques such as using a Bloom Filters (BF) may be used to substantially reduce the overhead. In such cases, the content router may be configured to announce the prefixes in the content store as a BF, which may be queried against the content routers receiving the BF as an update. This technique may require changes in the forwarding logic, since the BF technique may not be based on exact or substantial matching of the interest prefix with the prefix in the FIB, e.g., for the set of prefixes that are summarized in the BF. The false positive rate from matching in this case may be addressed by choosing appropriate parameter settings that may be needed to generate the BF with tolerable overhead resulting from flooding the BF.

Alternatively, another technique may be used to exploit naming to summarize the range or size of prefix announced by a content router. For instance, based on some pre-determined naming schema, if the summarization logic finds many content chunks belonging to the same publisher and referring to the same content, then the advertisement may be summarized under a single prefix with more meta-data fields. Such prefix with meta-data information may be configured to allow the receiving content router to interpret the prefix correctly to create the intended prefix entries in its FIB. The bloom filter technique or the name schema implemented to summarize the prefix announcements may allow encoding and decoding the announced prefixes without loss of information or errors.

Figure 10:
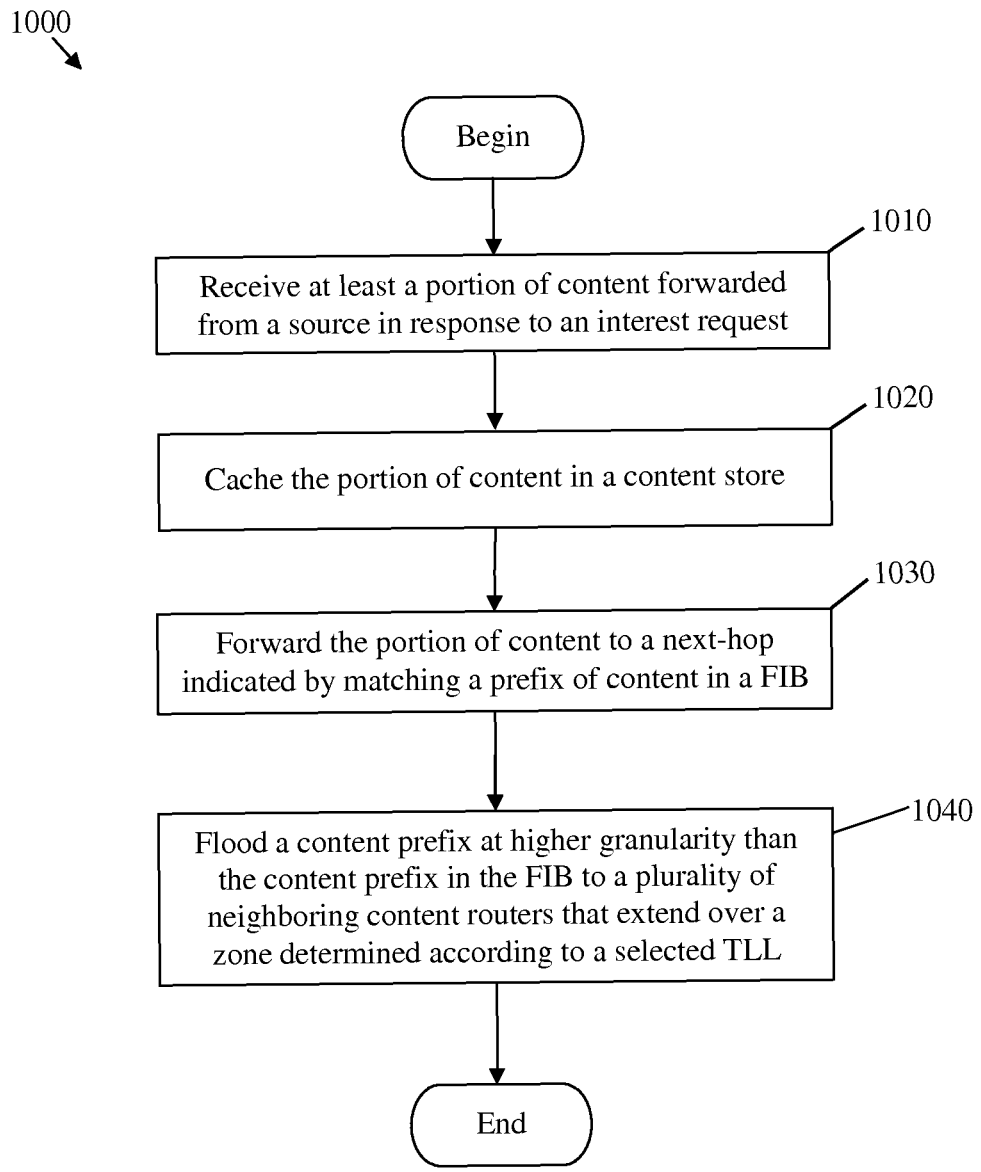
FIG. 10 is a flowchart of another embodiment of a caching method.

FIG. 10 illustrates an embodiment of a prefix flooding method 1000 that may be used in the schemes 700 and 900. The method 1000 may be implemented at a content router in the network (e.g., CCN or ICN). The method 1000 may begin at block 1010, where at least a portion of content forwarded from a source may be received in response to an interest request. The source may be an edge content router coupled to a publisher and the interest request may be sent by another edge content router coupled to a user. At block 1020, the portion of content may be cached in a content store in the content router. At block 1030, the portion of content may be forwarded to a next-hop indicated by matching a prefix of content in a FIB at the content router. The portion of content may be forwarded to a second content router on a path previously advertised by flooding an aggregated content prefix from the source. At block 1040, a content prefix at higher granularity than the content prefix in the FIB may be flooded to a plurality of neighboring content routers that extend over a zone determined according to a selected TLL. At least some of the neighboring content routers may not cache the content. The method 1000 may then end.

Figure 11:
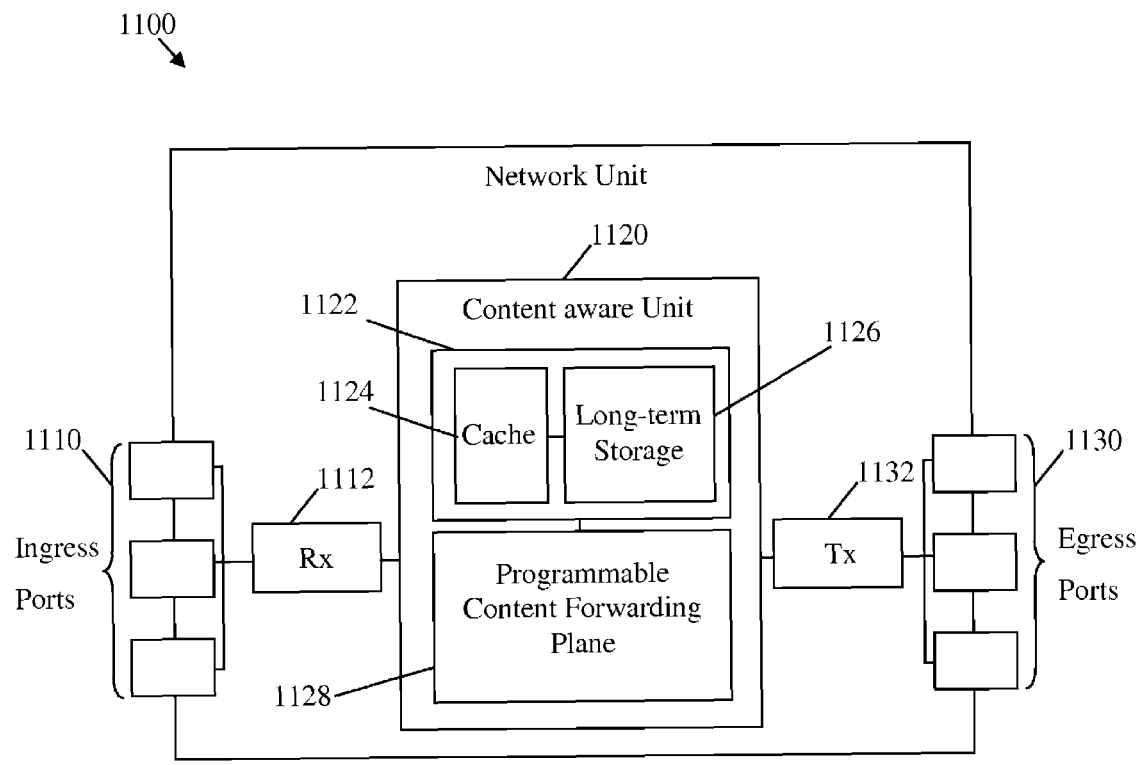
FIG. 11 is a schematic diagram of an embodiment of a network unit.

FIG. 11 illustrates an embodiment of a network unit 1100, which may be any device that transports and processes data through a network. For instance, the network unit 1100 may be located in the content router or any node in the CCN 100, or any node in the schemes described above. The content router may also be configured to implement or support the CON systems and methods described above. The network unit 1100 may comprise one or more ingress ports or units 1110 coupled to a receiver (R8) 1112 for receiving signals and frames/data from other network components. The network unit 1100 may comprise a content aware unit 1120 to determine which network components to send content to. The content aware unit 1120 may be implemented using hardware, software, or both. The network unit 1100 may also comprise one or more egress ports or units 1130 coupled to a transmitter (T8) 1132 for transmitting signals and frames/data to the other network components. The receiver 1112, content aware unit 1120, and transmitter 1132 may also be configured to implement at least some of the disclosed methods, which may be based on hardware, software, or both. The components of the network unit 1100 may be arranged as shown in FIG. 11.

The content aware unit 1120 may also comprise a programmable content forwarding plane block 1128 and one or more storage blocks 1122 that may be coupled to the programmable content forwarding plane block 1128. The programmable content forwarding plane block 1128 may be configured to implement content forwarding and processing functions, such as at an application layer or L3, where the content may be forwarded based on content name or prefix and possibly other content related information that maps the content to network traffic. Such mapping information may be maintained in a content table at the content aware unit 1120 or the network unit 1100. The programmable content forwarding plane block 1128 may interpret user requests for content and accordingly fetch content, e.g., based on meta-data and/or content name, from the network or other content routers and may store the content, e.g., temporarily, in the storage blocks 1122. The programmable content forwarding plane block 1128 may then forward the cached content to the user. The programmable content forwarding plane block 1128 may be implemented using software, hardware, or both and may operate above the IP layer or L2. The storage blocks 1122 may comprise a cache 1124 for temporarily storing content, such as content that is requested by a subscriber. Additionally, the storage blocks 1122 may comprise a long-term storage 1126 for storing content relatively longer, such as content submitted by a publisher. For instance, the cache 1124 and the long-term storage 1126 may include Dynamic random-access memories (DRAMs), solid-state drives (SSDs), hard disks, or combinations thereof.

Figure 12:
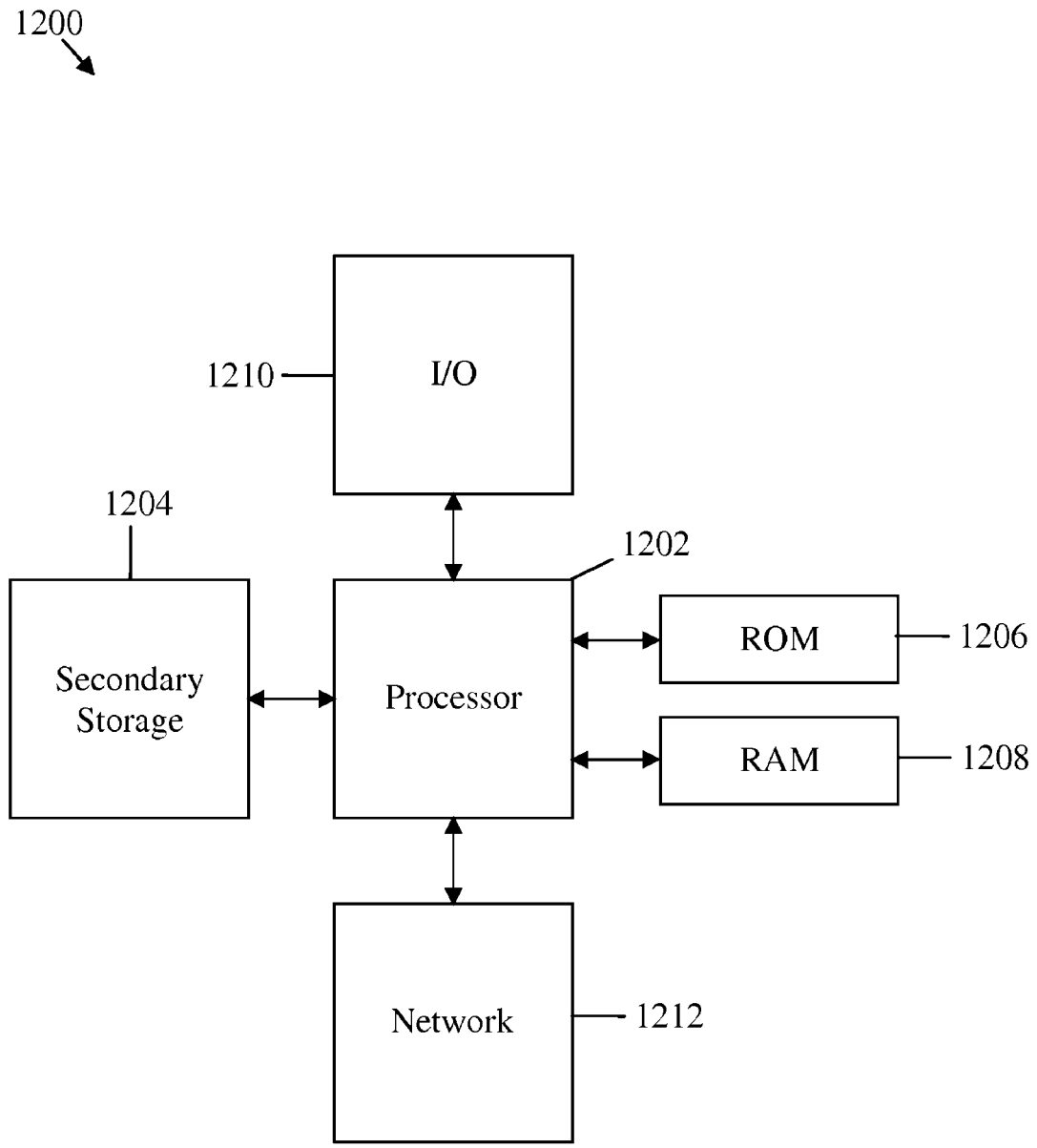
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 11 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 110 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 110 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A networking system comprising:
   a plurality of content routers coupled to each other and to a plurality of providers and configured to route and cache content data, wherein the content routers are further configured to locate and route requested content to a user node coupled to the content routers;
   wherein the providers are configured to publish content and the content routers are further configured to receive and cache the content data in response to an interest request for content and to flood a content identifier for the content data to a plurality of neighboring content routers within a specified radius, wherein the content identifier enables the plurality of neighboring content routers to determine a nearest location from which to obtain the content data to enable efficient content routing.

2. The networking system of claim 1, wherein the content routers are connected based on a content centric network (CCN) infrastructure and are configured to establish an Information Centric Network (ICN) for a service provider.

3. The networking system of claim 2, wherein the content identifier is flooded in a controlled manner to a bounded area in the CCN to achieve service differentiation and improved content dissemination.

4. The networking system of claim 3, wherein the content identifier flooding is controlled using at least one of a time to live (TTL) value and policy for selecting content identifiers.

5. The networking system of claim 4, wherein the TTL value indicates a number of next-hops that a content identifier announcement is allowed to travel from a source.

6. The networking system of claim 5, wherein the content identifier announcement comprises meta-data information that is used by the receiving neighboring content routers to create matching content identifier entries into corresponding forwarding information bases (FIBs).

7. The networking system of claim 4, wherein the content identifier announcement creates an island of reachability for the content identifier that allows an associated interest request to be resolved to a nearest cache location to a requesting node.

8. The networking system of claim 4, wherein the content identifier announcement is summarized using a bloom filter technique or a name schema that allows encoding and decoding the announced content identifier without loss of information.

9. The networking system of claim 3, wherein increasing the TTL value causes more efficient resolution of requested interest to a closest cache point to a requesting node.

10. The networking system of claim 1, wherein at least some of the neighboring content routers do not cache the content associated with the flooded content identifier.

11. A content router comprising:
a receiver configured to receive a content portion in a network in response to an interest request;
a content store configured to store the content portion; and
a transmitter configured to forward the content portion to a next-hop in the network indicated by matching a content identifier of content in a forwarding information base (FIB) and flood the content identifier to one or more neighboring content routers that are within a specified radius of the content router to enable the neighboring content routers to efficiently determine a nearest location for the content.

12. The content router of claim 11, wherein the flooded content identifier is more granular that the matching content identifier in the FIB that is obtained by an initial content identifier flooding from a source of the content, and wherein the higher granularity of the flooded content identifier provides more accurate location resolution of the associated cached content.

13. The content router of claim 12, wherein the flooded content identifier is sent via a first link state advertisement (LSA) and the content identifier in the FIB is advertised using a second LSA that has a different format than the first LSA, and wherein the first LSA comprises one or more advertised content identifiers from a content store of the advertising content router with higher granularity than content identifiers advertised in the second LSA.

14. The content router of claim 13, wherein the content identifiers advertised in the first LSA are selected based one or more local policies at the advertising content router.

15. The content router of claim 11, wherein the interest request is routed based on a longest content identifier match, and wherein the content identifier resolution of the interest request becomes more accurate when the routed interest reaches an island of content routers defined by the content identifier flooding.

16. The content router of claim 11, wherein the content identifier is flooded to the neighboring content routers to extend content reachability in the network and reduce end-to-end content delivery latency.

17. A method implemented by at least one content router in a network, comprising:
receiving at least a portion of content forwarded from a source in response to an interest request;
caching the portion of content in a content store;
forwarding the portion of content to a next-hop indicated by matching a content identifier of content in a forwarding information base (FIB); and
advertising a content identifier at higher granularity than the content identifier in the FIB to a plurality of neighboring content routers that extend over a zone determined according to a selected certain radius parameter encoded as a time to live (TTL) parameter.

18. The method implemented by at least one content router in a network of claim 17, wherein the TTL parameter value is determined based on network topology to guarantee improved performance and content reachability by content identifier advertisement.

19. The method implemented by at least one content router in a network of claim 17, wherein the content identifier is advertised in a soft-state link state advertisement (LSA) that is set to expire when a cache lifetime of a content router that advertises the content identifier expires.

20. The method implemented by at least one content router in a network of claim 17 further comprising:
receiving an advertisement for a second content identifier from a content router;
determining whether a neighboring content router has advertised the second content identifier;
advertising the second content identifier if the neighboring content router has not advertised the content identifier; and
discarding the advertisement if the neighboring content router has advertised the second content identifier.

* * * * *

UNITED STATES PATENT AND TRADEMARK OFFICE
CERTIFICATE OF CORRECTION

PATENT NO. : 8,667,172 B2
APPLICATION NO. : 13/311782
DATED : March 4, 2014
INVENTOR(S) : Ravishankar Ravindran, Guoqiang Wang and Kathleen Nichols It is certified that error appears in the above-identified patent and that said Letters Patent is hereby corrected as shown below:

On Title Page 2, Item (56), References Cited, under Other Publications, the following cited reference should read:

""MOTOBLUR," Motorola Mobility, Inc. USA, http://www.motorola.com/Consumers/US-EN-Consumer-Product-and-Services-/MOTOBLUR, downloaded August 31, 2011, 2 pages."

In the Claims

Column 15/Line 51 should read: "content identifier is more granular than the matching content"

Column 16/Line 10 should read: "identifiers advertised in the first LSA are selected based on one"

Signed and Sealed this
Third Day of June, 2014

Michelle K. Lee
*Deputy Director of the United States Patent and Trademark Office*